(12) United States Patent
Bonte et al.

(10) Patent No.: US 9,559,538 B1
(45) Date of Patent: Jan. 31, 2017

(54) SWITCH MODE BATTERY CHARGER WITH IMPROVED BATTERY CHARGING TIME

(71) Applicant: Maxim Integrated Products, Inc., San Jose, CA (US)

(72) Inventors: Olivier Bonte, Le Rouret (FR); Mark Belch, Chandler, AZ (US)

(73) Assignee: Maxim Integrated Products, Inc., San Jose, CA (US)

( * ) Notice: Subject to any disclaimer, the term of this patent is extended or adjusted under 35 U.S.C. 154(b) by 695 days.

(21) Appl. No.: 13/925,700

(22) Filed: Jun. 24, 2013

Related U.S. Application Data

(60) Provisional application No. 61/792,494, filed on Mar. 15, 2013.

(51) Int. Cl.
*H02J 7/00* (2006.01)

(52) U.S. Cl.
CPC .................................. *H02J 7/0055* (2013.01)

(58) Field of Classification Search
CPC ...................................................... H02J 7/0052
USPC ................................ 320/115, 134, 136, 137
See application file for complete search history.

(56) References Cited

U.S. PATENT DOCUMENTS

| | | | | |
|---|---|---|---|---|
| 5,442,274 A | * | 8/1995 | Tamai | H02J 7/0093 320/146 |
| 2005/0242772 A1 | * | 11/2005 | Cha | H02J 7/34 320/115 |
| 2008/0258674 A1 | * | 10/2008 | Hui | H02J 7/0044 320/101 |
| 2009/0001937 A1 | * | 1/2009 | Densham | H02J 7/00 320/145 |

* cited by examiner

*Primary Examiner* — Drew A Dunn
*Assistant Examiner* — Zixuan Zhou
(74) *Attorney, Agent, or Firm* — North Weber & Baugh LLP

(57) ABSTRACT

Various embodiments of the invention relate to a battery charging system that enhances the charge rate and reduces the charge time for a battery applied in a mobile device. The battery charging system is provided with an adapter output voltage, and generates a battery charging current to drive the battery. This adapter output voltage is controlled to vary within a reference voltage range which is narrowly controlled to include and track a preferred adapter voltage. The battery is therefore driven by the battery charging current that is associated with a preferred charging current under a preferred charging condition. The battery charging process may be completed under a condition that is substantially close to the preferred charging condition, allowing an enhanced battery charge rate and a reduced battery charge time.

17 Claims, 8 Drawing Sheets

100

400

600

800

SWITCH MODE BATTERY CHARGER WITH IMPROVED BATTERY CHARGING TIME

CROSS REFERENCE TO RELATED APPLICATION

The application claims the benefit under 35 U.S.C. §119 (e) of Provisional Application Ser. No. 61/792,494, entitled "A Switch Mode Battery Charger with Improved Battery Charging Time," filed on Mar. 15, 2013, the subject matter of which is incorporated herein by reference in its entirety.

BACKGROUND

A. Technical Field

The present invention relates to a battery charger in a mobile device, and more particularly, to systems, devices and methods of enhancing battery charge rate and reducing corresponding battery charge time for a battery that is driven and charged up by the battery charger.

B. Background of the Invention

A mobile device normally relies on a stable battery power source such as a lithium battery to provide power for its operation. In order to charge up the battery, an external AC-DC adapter is coupled to a wall outlet, and converts an alternative-current (AC) power of 100-240V to a direct-current (DC) power supply. When the mobile device is coupled to the AC-DC adapter via a hard wire, the battery within the mobile device is thereby charged up under the bias of the DC power supply. The charge time may vary significantly according to the volume of the battery that is used in a specific application. Nevertheless, the batteries in most consumer products may be fully charged within a few hours, and some state-of-the-art cellular phones, tablets or laptop computers may only require a couple of hours to reach a full battery charge.

A switch-mode DC-DC converter is normally incorporated within the mobile device as a switch-mode battery charger. The battery charger converts the DC power supply provided by the AC-DC adapter to a battery charging current, and the battery charging current is used to drive and charge up the battery. The switch-mode battery charger mainly relies on a switching regulator to control internal switching activities of a DC-DC converter core. An inductor is incorporated in the converter core to temporarily store power and release it for subsequent use. When the switching regulator alternates between two control states, the battery is continuously charged up by the power that is either directly provided by the external power source or previously stored in the inductor. In contrast with a linear regulator, such a switching based configuration allows the switch-mode battery charger to reach a much higher efficiency level for energy conversion.

Although the switch-mode battery charger is capable of providing relatively higher efficiency, it is a challenge to identify and maintain operation conditions that correspond to a preferred battery charging condition. The DC power supply provided at the adapter output may not be completely used to drive the battery because of the load-line impedance at the battery charger side. Driving capability and efficiency of the adapter is therefore compromised. Moreover, as other sources, rather than the electrical power, are used to charge the battery, driving capability of the corresponding adapter may drift over time, and is not as stable as the AC-DC adapter. In particular, driving capability of such an adapter may depend upon a load condition that is closely related to the battery state.

In prior art, most switch-mode battery chargers cannot efficiently compensate this drift of adapter driving capability, and therefore, the adapter is either insufficiently or overly driven, rather than being driven substantially under the preferred battery charging condition. It is particularly undesirable to overdrive the adapter, because the adapter output voltage may drastically drop with a minor increase of a corresponding overdrive current. Therefore, the battery charging power could be largely compromised for an overdriven AC-DC adapter. Likewise, an insufficiently driven adapter is also associated with a compromised adapter output power, even though the level of degradation is not as serious as that for the overdriven adapter.

Degradation of the adapter output power directly leads to a lower charge rate and an extended charge time for the battery. Therefore, a need exists to identify and maintain a preferred battery charging condition for a battery charging system associated with a battery in a mobile device, such that power provided by an external power source may be efficiently converted and used to drive and charge up the battery quickly.

SUMMARY OF THE INVENTION

Various embodiments of the invention relate to a battery charging system that enhances the charge rate and reduces the charge time for a battery applied in a mobile device.

In accordance with one embodiment of the invention, a battery charging system for a mobile device comprises an adapter, a battery charger and a battery. The adapter receives power from a power source and generates an adapter output voltage. The adapter output voltage varies within a reference voltage range that is substantially narrow and includes a preferred adapter voltage. The preferred adapter voltage is associated with a preferred battery charging condition under which the battery is driven and charged up with a preferred charging power. The battery charger generates a battery charging current that is monitored to allow the reference voltage range to track a variation of load condition at the output of the adapter. Therefore, the battery is driven and charged up by the battery charging current when the mobile device is coupled to the power source, and power stored in the battery is released to drive normal operation of the mobile device when the mobile device is decoupled from the power source.

In accordance with another embodiment of the invention, a battery charging system comprises an adapter and a battery charger. The adapter provides an adapter output voltage that varies within a reference voltage range, and the reference voltage range is substantially narrow, includes a preferred adapter voltage, and tracks a variation of load condition at the output of the adapter. The battery charger generates a battery charging current to drive and charge up the battery.

In addition, a corresponding method is disclosed to efficiently charge up a battery in a mobile device. A reference voltage range is first determined to include a preferred adapter voltage. The preferred adapter voltage is associated with a preferred battery charging condition under which an adapter receives power from a power source to drive and charge up the battery with a preferred charging power. The reference voltage range is substantially narrow and tracks a variation of load condition at the output of the adapter. The adapter output voltage is thereby generated and varies within the reference voltage range. A battery charging current is further generated to drive and charge up the battery when the mobile device is coupled to the power source.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
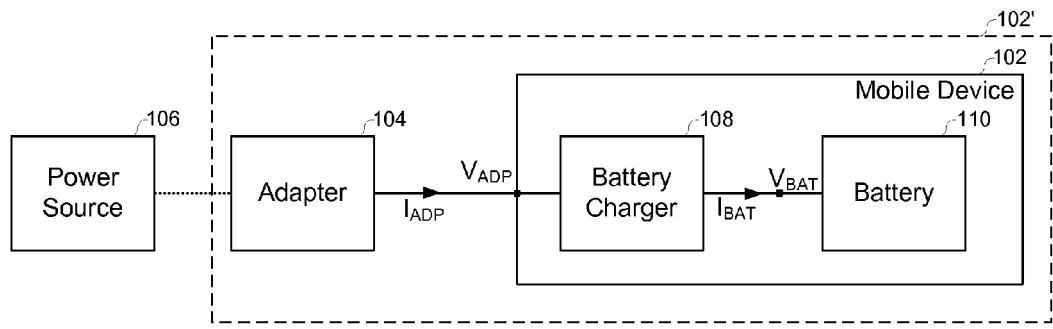
FIG. 1 illustrates an exemplary block diagram of a battery charging system for a mobile device according to various embodiments in the invention.

FIG. 1 illustrates an exemplary block diagram of a battery charging system 100 for a mobile device 102 according to various embodiments in the invention. A mobile device 102 relies on a power adapter 104 and a battery charger 108 to garner energy from an external power source 106 and charge up its battery 110. The power adapter 104 receives power from the power source 106 and generates a DC adapter voltage $V_{ADP}$. A battery charger 108 is integrated within the mobile device 102, and coupled to receive the DC adapter voltage $V_{ADP}$ during a battery charge process. A battery charging voltage $V_{BAT}$ is thereby generated by the battery charger 108 to drive and charge up the battery 110 that is included in the mobile device 102. Once the mobile device 102 is decoupled from the adapter 104, power stored in the battery 110 may be used to drive normal operation of the mobile device 102.

In accordance with the invention, the battery charger 108 is configured to improve the output power of the adapter 104, and particularly, the adapter voltage $V_{ADP}$ is outputted to oscillate within a reference voltage range that includes and tracks a preferred adapter voltage $V_{OPT}$. This preferred adapter voltage $V_{OPT}$ is associated with a preferred charging power $P_{OPT}$ that may be provided by the adapter 104 to efficiently charge up the battery 110, and for a quick battery charge, the battery 110 is preferred to be driven and charged up with such a preferred charging voltage $V_{OPT}$. As the reference voltage range is controlled to be substantially narrow, the adapter voltage $V_{ADP}$ is close to the preferred charging voltage $V_{OPT}$, and thus, substantially relates to the preferred charging power $P_{OPT}$. As a direct consequence, the battery 110 may be charged up efficiently with an enhanced charge rate, and the battery charge time may be substantially reduced.

In some embodiments, the reference voltage range may be adjusted to track the variation of the preferred charging voltage $V_{OPT}$ based on a load variation at the adapter output. The preferred charging voltage $V_{OPT}$ normally drifts to a distinct level when the load, i.e., the impedance resulting from the mobile device 102, varies at the adapter output. The reference voltage range is controlled to track the drift of the preferred charging voltage $V_{OPT}$. Limited within the reference voltage range, the adapter voltage $V_{ADP}$ also tracks the load variation at the adapter output, allowing a dynamic battery charge process in which the power provided to charge the battery 102 is controlled substantially close to the preferred charging power $P_{OPT}$ regardless of its drift.

Most mobile devices 102 in our daily life rely on the main electricity, i.e., a general-purpose AC electric power supply, coupled on wall outlets to function as the power source 106. Such a power source 106 provides an AC supply voltage that is generally in the range of 100-240V and adopts a frequency of 50 Hz or 60 Hz. Accordingly, the adapter 104 is configured as an AC-DC voltage regulator that converts the AC supply voltage to the DC adapter voltage $V_{ADP}$.

Although the adapter 104 may be configured as a standalone device, a desktop or laptop computer may also function as the adapter 104 in certain embodiments. The desktop computer is constantly coupled to receive power from the main electricity, while the laptop computer has the option of being powered by the main electricity or its own computer battery. The mobile device 102 is coupled to the computer via a universal serial bus (USB) cable and driven by the DC supply voltage outputted at the USB interface, regardless of whether the computer is powered by the main electricity or the computer battery.

In some embodiments, the adapter 104 receives power from power sources 106 different from the conventional main electricity. Such alternative power sources may provide other forms of energy, such as electromagnetic, solar, kinetic and thermal energy. The adapter 104 includes a special interface to harvest energy from these alternative power sources 106 for battery charging. In particular, the electromagnetic, solar and kinetic energy may be harvested using an inductive link, a photovoltaic device and a piezoelectric sensor, respectively In contrast with the main electricity, the alternative power sources 106 may be conveniently coupled with the adapter 104 without any hard wire link, even though the adapter 104 has to be particularly configured to harvest energy from various types of power sources 106.

In certain embodiments, the mobile device 102 is configured to a mobile device 102' that incorporates the adapter 104. Strict requirements are normally imposed on the size of the mobile device 102'. Therefore, the form factor of the adapter 104 needs to be improved and comply with the size requirements, before such integration may be accommodated by the mobile device 102'.

As a consequence of energy conversion, the DC adapter voltage $V_{ADP}$ is provided by the adapter 104 as a DC supply voltage to drive the battery charger 108 within the mobile device 102. In various embodiments, the magnitude of the adapter voltage $V_{ADP}$ may be substantially equal to 5V, 12V or 30V, while the battery charger 108 functions as a DC-DC converter to further regulate the DC adapter voltage $V_{ADP}$ to another DC voltage, the battery charging voltage $V_{BAT}$, which is directly used to drive the battery 110. As an example, the magnitude of the battery charging voltage $V_{BAT}$ may be 4.5V for some mobile devices.

The battery charger 108 is implemented based on a switching mode that includes alternative active and inactive periods. Inductors and capacitors are applied in the battery charger 108 for temporary power storage, such that the battery 110 is continuously charged regardless of active or inactive periods. The efficiency of the battery charger 108 determines how much of the power provided by the adapter is used to charge the battery 110. In particular, the charge time of the battery 110 is directly associated with the corresponding battery charging power $P_{BAT}$ that is actually delivered to the battery 110 by the battery charger 108.

Figure 2A:
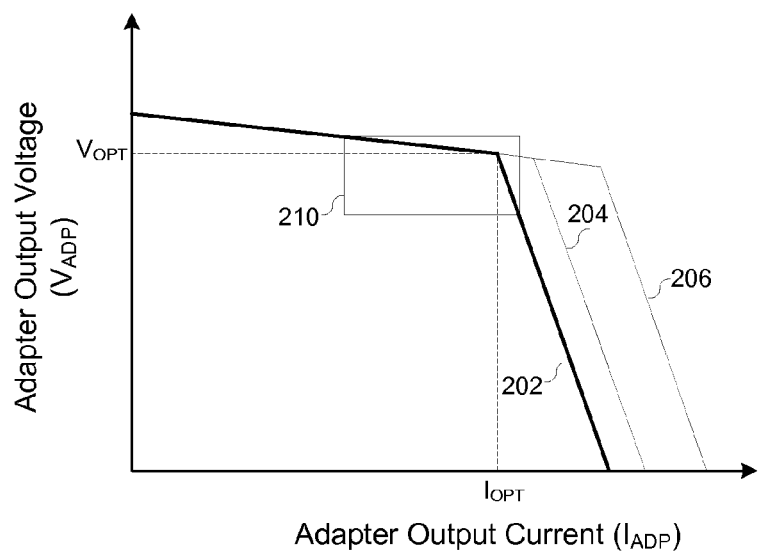
FIG. 2A illustrates an exemplary I-V relationship between an adapter output voltage $V_{ADP}$ and an adapter output current $I_{ADP}$ according to various embodiments in the invention.
Figure 2B:
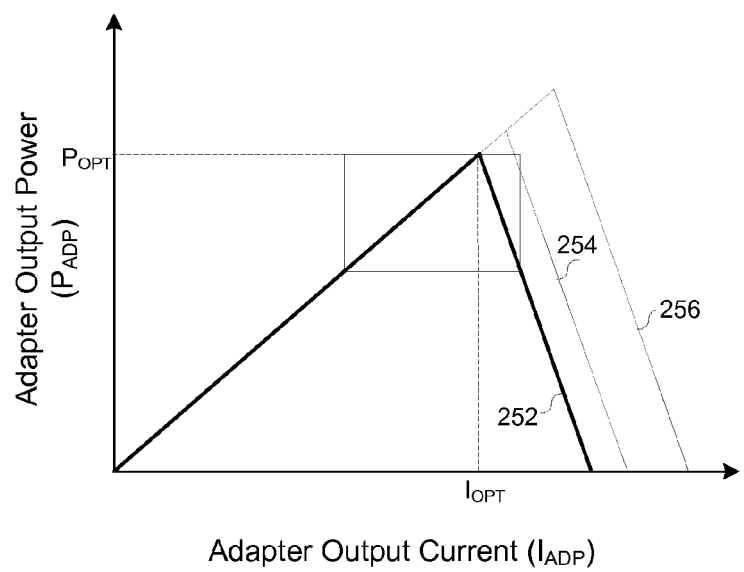
FIG. 2B illustrates a corresponding I-P relationship between an adapter output power $P_{ADP}$ and an adapter output current $I_{ADP}$ according to various embodiments of the invention.

FIG. 2A illustrates an exemplary I-V relationship 200 between an adapter output voltage $V_{ADP}$ and an adapter output current $I_{ADP}$ according to various embodiments in the invention, and FIG. 2B illustrates a corresponding I-P relationship 250 between an adapter output power $P_{ADP}$ and an adapter output current $I_{ADP}$ according to various embodiments of the invention. Different I-V relationships 202, 204 and 206 apply according to the load at the output of the adapter 104. So do different I-P relationships 252, 254 and 256. A variation of the adapter load happens when different mobile devices 102 is loaded to the adapter 104 or when the same mobile device 102 is loaded to the adapter 104 with its battery charged to different power levels. In addition, different I-V and I-P relationships, 202-206 and 252-256, may vary during the course of one battery charge process, particularly because the load at the adapter output varies when the power level of the battery increases. Hereby, FIGS. 2A and 2B show three sets of such relationships associated with three load conditions.

Each particular load condition is associated with a preferred charging condition under which the battery 110 receives efficient power delivery and is charged up quickly. Under the preferred charging condition, the battery charger 108 generates a preferred adapter voltage $V_{OPT}$ and delivers a preferred charging current $I_{OPT}$ according to the I-V relationship 202. Therefore, the power provided by the adapter 104 peaks at a preferred charging power $P_{OPT}$ under this preferred charging condition, enabling an efficient battery charging process.

When the battery charging system 100 deviates from the preferred charging condition, both the adapter output voltage $V_{ADP}$ and the adapter output current $I_{ADP}$ drift away from their preferred magnitudes, and the preferred charging power $P_{OPT}$ is lost as well. In one situation, the system 100 drifts towards a charging condition associated with a lower adapter output current $I_{ADP}$. The adapter output voltage $V_{ADP}$ increases slowly with the drop of the current $I_{BAT}$, while the adapter output power $P_{ADP}$ follows the current drop. In another situation, the system 100 drifts towards another output condition associated with a higher adapter output current $I_{ADP}$. The adapter output voltage $V_{ADP}$ drops drastically with the drop of the current $I_{ADP}$, and so does the adapter output power $P_{ADP}$ decrease drastically with the voltage $V_{ADP}$.

In some prior art, a fixed preferred adapter voltage $V_{OPT}$ are used to control the battery charger, and when the load condition changes at the adapter output, such a representation is inaccurate any more. The adapter works under a compromised condition that drifted away from the preferred charging condition. A slight drift towards a lower adapter current may not compromise the battery charge rate significantly; however, a slight drift towards the opposite side is highly undesirable. As a result, the prior art batteries in the mobile devices oftentimes drift away from the preferred charging condition without even being noticed.

In accordance with the invention, a reference voltage range 210 is determined around the preferred charging condition, and thus, includes the preferred adapter voltage $V_{OPT}$. The adapter output voltage $V_{ADP}$ is regulated by the battery charger 108 to oscillate within the reference voltage range 210. The reference voltage range 210 is controlled to be substantially narrow, and an exemplary reference voltage range is about several tens or hundreds of millivolts. Based on such a narrowly controlled reference voltage range 210, the battery charging system 100 functions substantially around the preferred charging condition, such that the adapter output voltage $V_{ADP}$ is controlled to be substantially close to the preferred adapter voltage $V_{OPT}$ and that the battery 110 may be efficiently charged up by a corresponding battery charging current $I_{BAT}$.

Figure 3:
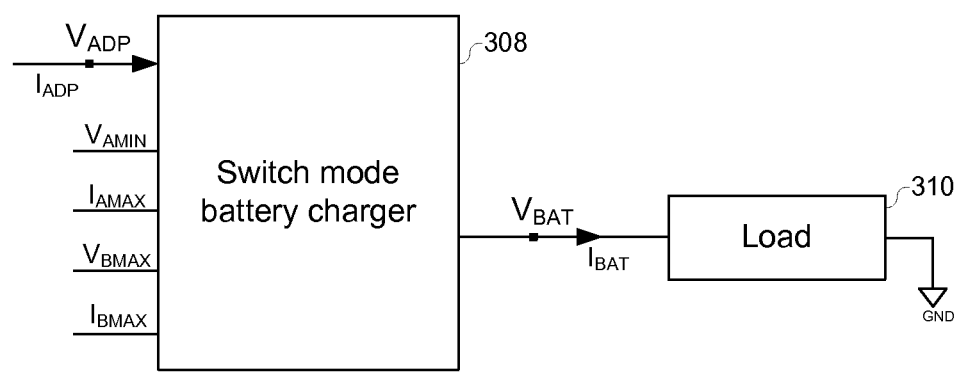
FIG. 3 illustrates an exemplary block diagram of an internal battery charging sub-system in a mobile device according to various embodiments in the invention.

FIG. 3 illustrates an exemplary block diagram 300 of an internal battery charging sub-system in a mobile device according to various embodiments in the invention. The internal battery charge sub-system 300 comprises a switch mode battery charger 308 and a load 310. The switch mode battery charger 308 is coupled to receive an adapter voltage $V_{ADP}$ and generates a battery charging current $I_{BAT}$ to drive the load 310. Hereby, the load 310 mainly comprises a battery, while corresponding load-line constitutes an excessive load to the switching mode battery charger 308 as well.

The switch mode battery charger 308 relies on a plurality of input and output (I/O) parameters to define the characteristics of the input and output signals involved in the corresponding DC-DC conversion. These I/O parameters include a minimum adapter voltage $V_{AMIN}$, a maximum adapter current $I_{AMAX}$, a maximum battery charging voltage $V_{BMAX}$ and a maximum battery charging current $I_{BMAX}$. Accordingly, the adapter voltage $V_{ADP}$ is held beyond the minimum adapter voltage $V_{AMIN}$, and the adapter current $I_{ADP}$ is clamped below the maximum adapter current $I_{AMAX}$. Likewise, the battery charging voltage $V_{BAT}$ and current $I_{BAT}$ are maintained below the maximum battery charge voltage $V_{BMAX}$ and current $I_{BMAX}$, respectively.

In some prior art, the I/O parameters are fixed parameters, and the same I/O parameters are repeatedly applied in the switch mode battery charger 308 regardless of the condition of the load 310.

In accordance with this invention, the I/O parameters are either externally provided or internally generated. In one particular embodiment, the minimum adapter charge voltage $V_{AMIN}$ is set forth and adjusted internally according to the adapter output voltage $V_{ADP}$ and the corresponding battery charging current $I_{BAT}$ that is generated to drive the load. This minimum adapter voltage $V_{AMIN}$ is also referred to as a reference voltage. This reference voltage $V_{AMIN}$ defines the reference voltage range within which the adapter output voltage $V_{ADP}$ oscillates. The adapter output voltage $V_{ADP}$ is controlled to comply with the minimum battery charge voltage $V_{AMIN}$, i.e., the reference voltage, and thus, oscillates within the reference voltage range.

Figure 4:
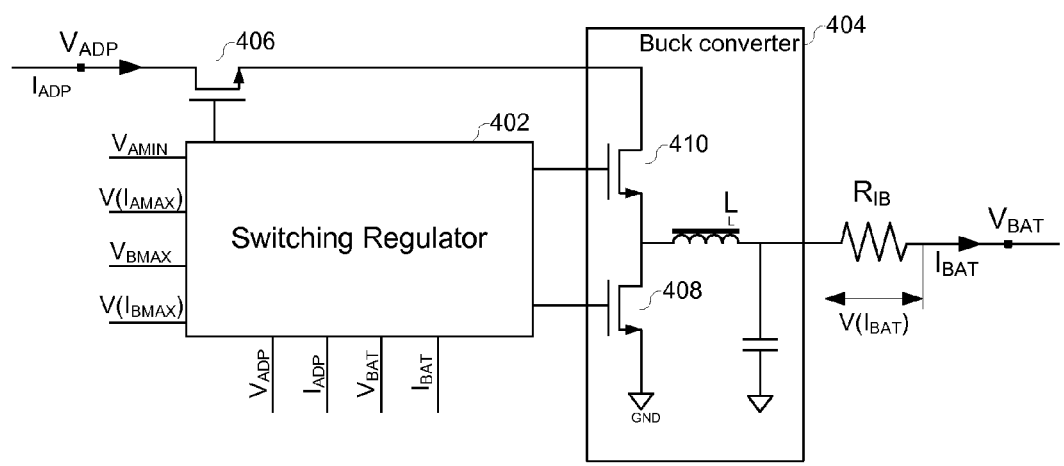
FIG. 4 illustrates an exemplary block diagram of a switch mode battery charger that is included in a mobile device according to various embodiments in the invention.

FIG. 4 illustrates an exemplary block diagram 400 of a switch mode battery charger that is included in a mobile device according to various embodiments in the invention. The switch mode battery charger 400 includes a switching regulator 402, a buck converter 404 and a control switch 406. The switch 406 controls coupling to the adapter voltage $V_{ADP}$ which is further converted by the buck converter 404 to a lower DC voltage, i.e., the battery charging voltage $V_{BAT}$. Both the control switch 406 and the buck converter are controlled by the switching regulator 402.

In accordance with the invention, the minimum adapter voltage $V_{AMIN}$ is also dynamically controlled according to the adapter voltage $V_{ADP}$ and the battery charging current $I_{BAT}$ that are used to drive the battery load. The switching regulator 402 monitors the output condition of the adapter, and adjusts the voltage $V_{AMIN}$ when the output condition deviates from the preferred charging condition in FIGS. 2A and 2B. Since the battery charging current $I_{BAT}$ is related to and substantially follows the adapter output current $I_{ADP}$, the switching regulator 402 senses the battery charging current $I_{BAT}$ associated with a certain adapter voltage $V_{ADP}$, determines whether the preferred charging condition is substantially maintained, and if not, adjusts the reference voltage $V_{AMIN}$. The adapter voltage $V_{ADP}$ is controlled to track the reference voltage $V_{AMIN}$, and therefore, protected from substantially deviating from the preferred adapter voltage $V_{OPT}$.

To facilitate current sensing, a current sensing resistor $R_{IB}$ is placed in series along the path of the battery charging current $I_{BAT}$. The switching regulator 402 is coupled to receive a bias voltage $V(I_{BAT})$ across the resistor $R_{IB}$, such that the battery charging current $I_{BAT}$ may be derived from the bias voltage $V(I_{BAT})$.

In this embodiment, the buck converter 404 adopts a synchronous topology and comprises an inductor L, a low-side NMOS switch 408 and a high-side switch 410. The high-side switch 410 may be a PMOS or NMOS transistor. The high-side and low-side switches 408 are turned on during active and inactive periods, respectively, such that the battery charging voltage $V_{BAT}$ is controlled substantially around the voltage $V_{BMAX}$. During the active periods, the adapter voltage $V_{ADP}$ is coupled to drive the load 310 via a path that comprises the control switch 406, the high-side switch 410 and the inductor L. In addition, energy is stored in the inductor L. During the subsequent inactive period, the high-side switch 410 is turned off, and the low-side switch 408 is turned on. The load 310 is decoupled from the adapter voltage $V_{ADP}$, and the energy within the inductor L is released to drive the load 310.

The high-side and low-side switch controls are respectively used to control the high-side and low-side switches in the buck converter 404. These two switch controls are enabled alternatively, and may adopt distinct duty cycles. In particular, a tri-state time $t_0$ is preferably maintained between two consecutive active durations of the high-side and low-side switch controls. For a particular maximum battery voltage $V_{BMAX}$, the switching regulator 402 determines the high-side and low-side switch controls by comparing the battery charging voltage $V_{BAT}$ at the output of the buck converter 404 and the voltage $V_{BMAX}$. As a result, the high-side and low-side switch controls enable alternating active and inactive periods, and the battery charging voltage $V_{BAT}$ is controlled to be substantially equal to the voltage $V_{BMAX}$.

One of those skilled in the art knows that the buck converter 404 may also adopt other topologies, such as certain nonsynchronous topologies. The switch controls generated by the switching regulator are also adjusted according to the particular converter topology. In some embodiments, the control switch 406 is optional, and may not be required for related DC-DC voltage conversion.

Figure 5:
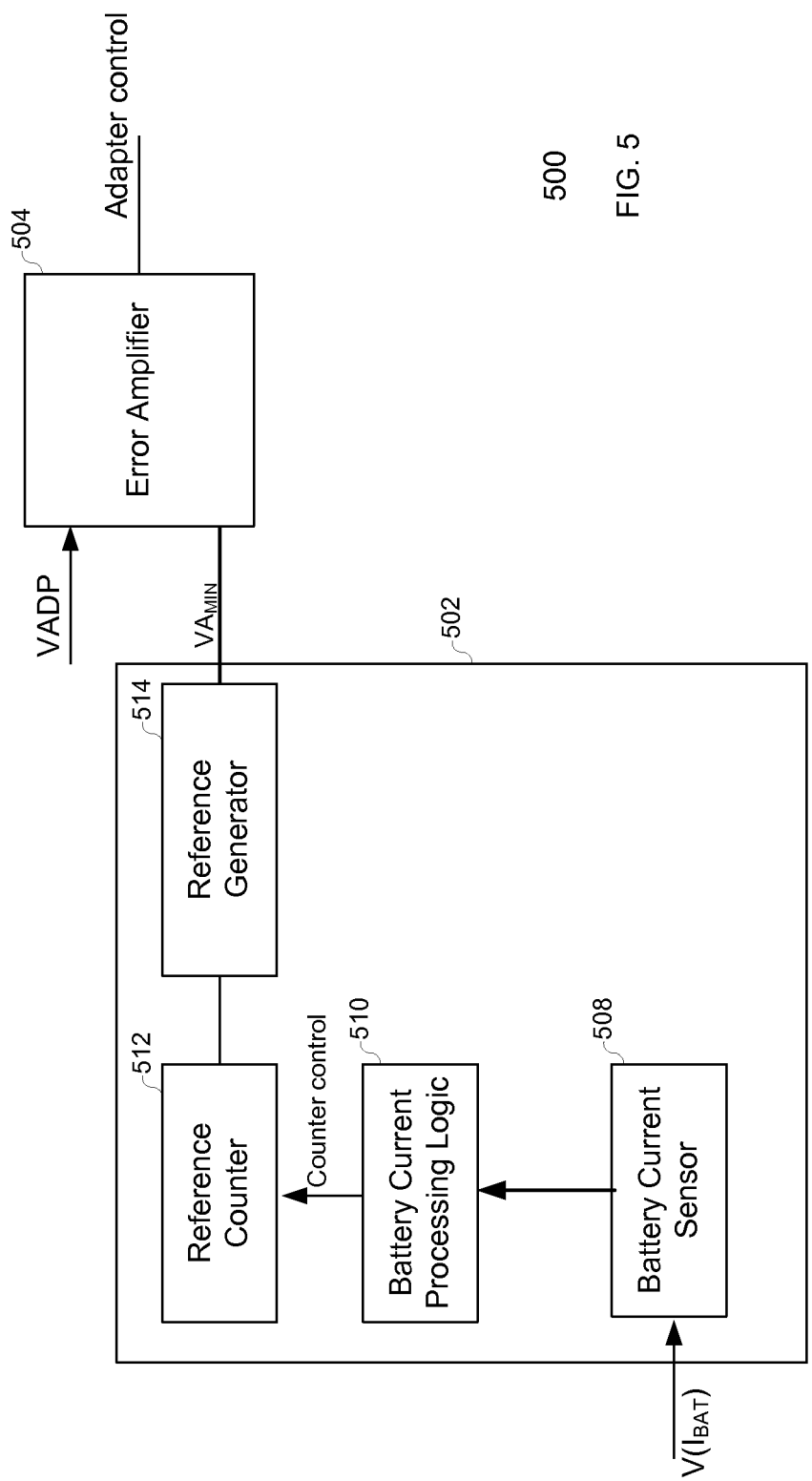
FIG. 5 illustrates an exemplary block diagram of an adapter voltage controller included in a switching regulator according to various embodiments in the invention.

FIG. 5 illustrates an exemplary block diagram 500 of an adapter voltage controller included in a switching regulator according to various embodiments in the invention. The adapter voltage controller comprises a reference generator 502 and an error amplifier 504. The reference generator 502 provides a reference voltage $V_{AMIN}$, i.e., the minimum adapter voltage. The error amplifier 504 generates an adapter control indicating whether the adapter voltage $V_{ADP}$ drops below the reference voltage $V_{AMIN}$. The adapter control is provided to the adapter 104 for further adjustment of the adapter voltage $V_{ADP}$. By this means, the adapter voltage $V_{ADP}$ may substantially track the reference voltage $V_{AMIN}$.

In a certain embodiment, the reference generator 502 further comprises a reference counter 512 and a reference generator 514 that control the minimum adapter voltage $V_{AMIN}$. The adapter reference generator 514 generates a reference voltage, i.e., $V_{AMIN}$, and the reference counter 512 controls the reference generator 514 to incrementally or decreasingly adjust the reference voltage $V_{AMIN}$ by a voltage step $\Delta V$. The fixed reference voltage in prior art may be sufficiently generated, when the counter 512 controls the generator 514 to reach and stabilize at a predetermined reference voltage level.

In accordance with the invention, the reference generator 502 further comprises a battery current sensor 508 and battery current processing logic 510. The reference battery current sensor 508 samples and holds the bias voltage $V(I_{BAT})$ during consecutive detections. Each detection accompanies one reference voltage step enabled by the reference counter 512. The battery current processing logic 510 determines whether the preferred charging condition is reached by monitoring the bias voltage $V(I_{BAT})$ sampled during the consecutive detections. A counter control is generated by the logic 510 to control the reference counter 512. As a result, the counter 512 may further control the reference generator 514 to oscillate at a few voltage steps surrounding the preferred charging condition, resulting in a reference voltage range that is substantially narrow but includes the preferred charging voltage $V_{OPT}$.

Figure 6:
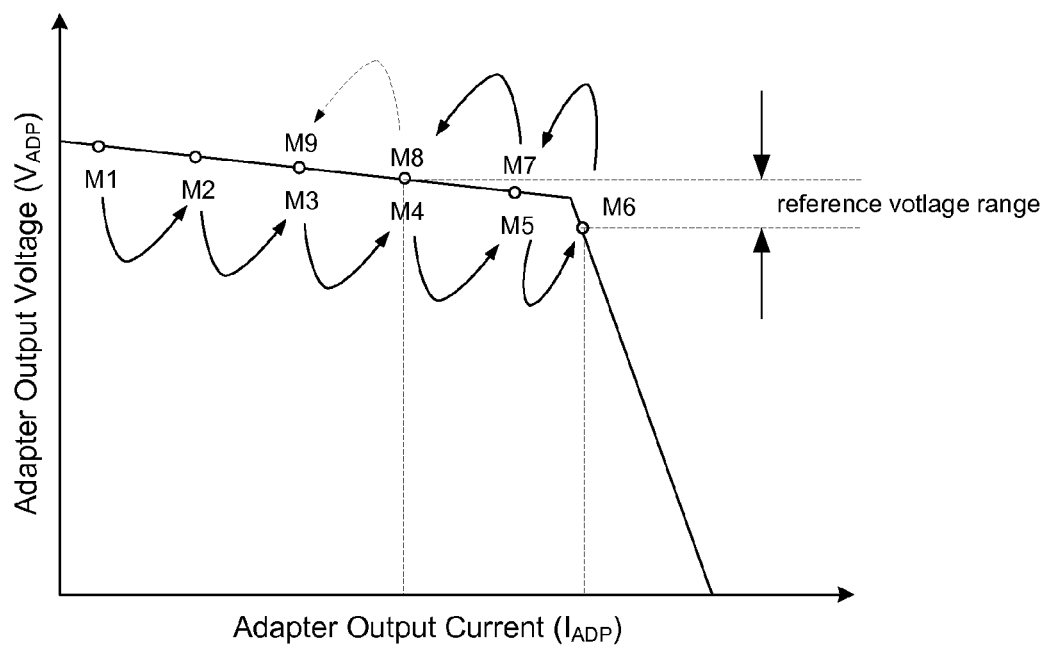
FIG. 6 illustrates an exemplary mechanism of determining a reference voltage range for an adapter output voltage $V_{ADP}$ according to various embodiments in the invention.

FIG. 6 illustrates an exemplary mechanism 600 of determining a reference voltage range for an adapter output voltage $V_{ADP}$ according to various embodiments in the invention. In the mechanism 600, the adapter output voltage $V_{ADP}$ is reset to a high initial voltage, drops to a reference voltage range and finally oscillates within the reference voltage range. In this embodiment, the adapter output voltage $V_{ADP}$ is controlled to increase or decrease at a constant voltage step $\Delta V$ by the adapter controller 500.

As the adapter output voltage $V_{ADP}$ drops from M1 to M5, a substantially constant variation of the bias voltage $V(I_{BAT})$ is sensed by the battery current sensor 508. However, at M6, the variation of the bias voltage $V(I_{BAT})$ is substantially smaller than the constant variation sensed at M2-M5, indicating that a preferred charging condition is detected between this condition M6 and the prior condition M5. The battery current processing logic 510 thereby generates the counter control that enables the reference counter 512 to reverse its counting order. At M7, the adapter output voltage $V_{ADP}$ is increased by the voltage step $\Delta V$, and the variation of the bias voltage $V(I_{BAT})$ is sensed to be substantially equal or higher to that sensed at M6.

At M8, the adapter output voltage $V_{ADP}$ is again increased by the voltage step $\Delta V$, and however, the variation of the bias voltage $V(I_{BAT})$ is sensed to be substantially smaller than that sensed at M7. The reference counter 512 is thereby controlled by battery current processing logic 510 to reverse its counting order again, and repeatedly counts between M4 and M6. As a result, the switch mode battery charger 308 may be controlled to oscillate among the states M4-M8, and thus, generates the adapter output voltage $V_{ADP}$ that oscillates between the reference voltages at M4 and M6.

In a certain embodiment, the adapter output voltage $V_{ADP}$ is controlled to increase or decrease by a voltage step $\Delta V$ of 20 mV. The preferred adapter voltage $V_{OPT}$ is approximately 4.5V. Therefore, the adapter output voltage $V_{ADP}$ oscillates with a reference voltage range of 40 mV around the preferred adapter voltage $V_{OPT}$ of 4.5V.

In some embodiments, the high end of the reference voltage range does not terminate at M8, and neither is it determined by comparing the variation of the bias voltage $V(I_{BAT})$ with that sensed at a previous state, e.g., M7. Rather, a fixed number of voltage steps are applied to define the reference voltage range. For instance, three voltage steps may be required, such that the reference voltage range covers the states M3-M9.

As discussed above, the reference voltage range is not fixed. Once the preferred charging condition drifts due to certain reasons, the reference voltage range is adjusted accordingly by the adapter controller 500 in the switching regulator 402, so as to track such a drift. In one case, the preferred charging condition drifts towards a lower adapter output voltage, i.e., towards the right of the diagram 600. At M6, the variation of the bias voltage $V(I_{BAT})$ is not sensed to be substantially smaller than that sensed at M5. The adapter output voltage $V_{ADP}$ is controlled to drop by another voltage step $\Delta V$ at M5, rather than being controlled to increase by the step $\Delta V$. Such control continues till a variation of the bias voltage $V(I_{BAT})$ is sensed to be substantially smaller than that sensed at a previous detection.

In another case, the preferred charging condition drifts towards a higher adapter output voltage, i.e., towards the left of the diagram 600. As the adapter output voltage $V_{ADP}$ is controlled to oscillate among M4-M8, substantially small variations may be sensed for the battery charging current $I_{BAT}$. The adapter current processing logic 510 may adopt a threshold variation $\Delta V(I_{BAT})$. Upon consecutive detections of small variations below $\Delta V(I_{BAT})$, the counter control is generated to control the reference counter 514 to increase the reference voltage $V_{BMIN}$ and thus the adapter output voltage $V_{ADP}$.

Figure 7:
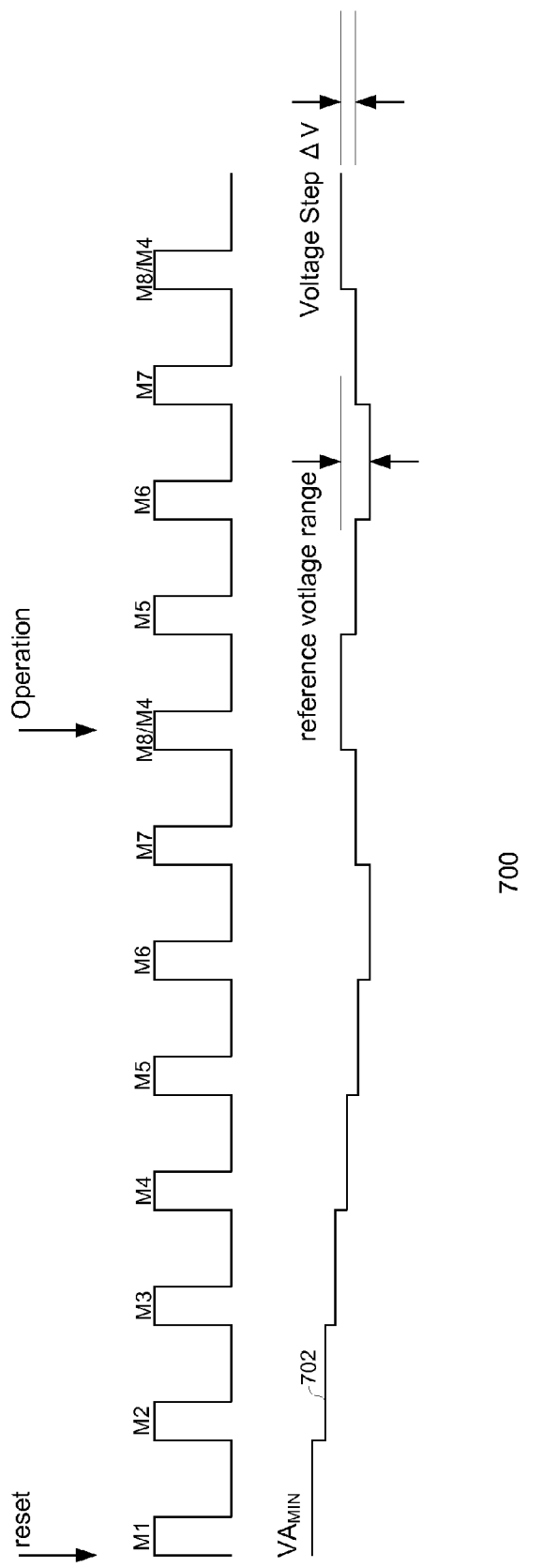
FIG. 7 illustrates exemplary time diagrams of a regulation control and a reference voltage, i.e., minimum adapter output voltage $V_{AMIN}$, according to various embodiments in the invention.

FIG. 7 illustrates exemplary time diagrams 700 of a regulation control and a reference voltage, i.e., minimum adapter output voltage $V_{AMIN}$, according to various embodiments in the invention. The time diagrams 700 are associated with the mechanism 600 in FIG. 6. The regulation control enables continuous regulation cycles corresponding to states M1-M8, and within each regulation cycle, the reference voltage $V_{BMIN}$ is controlled to increase or decrease by the voltage step $\Delta V$.

During each regulation cycle, the battery charging current $I_{BAT}$ is sensed for controlling the adapter output voltage $V_{ADP}$. In particular, the current $I_{BAT}$ is sensed in the reference generator 502 for use to determine the reference voltage $V_{AMIN}$, and the adapter output voltage $V_{ADP}$ is controlled to substantially follow the reference voltage $V_{AMIN}$ as in curve 702. The reference voltage $V_{AMIN}$ is controlled to oscillate within the reference voltage range, and so is the adapter output voltage $V_{ADP}$.

Figure 8:
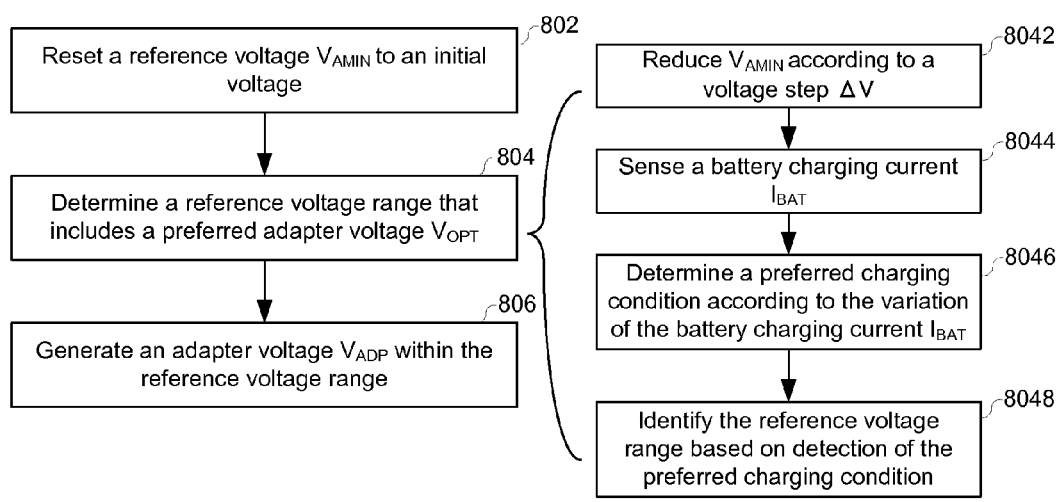
FIG. 8 illustrates an exemplary flow chart for a method of improving battery charge rate and time according to various embodiments in the invention.

FIG. 8 illustrates an exemplary flow chart 800 for a method of improving battery charge rate and time according to various embodiments in the invention. At step 802, a reference voltage $V_{AMIN}$ is reset to an initial voltage. An adapter output voltage $V_{ADP}$ is generated according to the reference voltage $V_{AMIN}$ to drive a battery load. The initial voltage is so selected that a corresponding battery charging current $I_{BAT}$ is substantially low.

At step 804, a reference voltage range is determined for the adapter output voltage $V_{ADP}$. The reference voltage range includes a preferred adapter voltage $V_{OPT}$ that is associated with a preferred charging power $P_{OPT}$ for battery charging. The reference voltage range is substantially narrow and tracks the variation of the preferred adapter voltage $V_{OPT}$, when the load condition drifts causes the preferred charging condition to drift.

In one particular embodiment, the reference voltage $V_{AMIN}$ is reduced from the initial voltage according to a voltage step $\Delta V$ at step 8042. As the adapter output voltage $V_{ADP}$ tracks the reference voltage $V_{BMIN}$, the battery charging current $I_{BAT}$ is sensed during consecutive regulation cycles at step 8044. A preferred charging condition is detected according to the variations of the battery charging current $I_{BAT}$ during the regulation cycles at step 8046. A reference voltage range is identified based on detection of the preferred charging condition at step 8048. The reference voltage range includes the preferred adapter voltage $V_{ADP}$ associated with the preferred charging condition.

At step 806, the adapter output voltage $V_{ADP}$ is generated within the reference voltage range. The adapter output voltage $V_{ADP}$ is controlled to oscillate within the reference voltage range, and used to efficiently charge up the battery load.

One of those skilled in the art knows that the mobile device 102 may be a cellular phone, a tablet, a laptop computer and any device that includes a battery to power its operation. This invention allows the battery in such a mobile device to be charged up efficiently around their respective preferred battery charging condition. Although such a preferred condition may drift among different battery charges or during one battery charge, the internal battery charger is capable of tracking such drift and maintains battery charging around the preferred charging condition. As a result, the battery charge rate is enhanced, and the battery charge time for the mobile devices is reduced.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A battery charging system for a mobile device, comprising:
   an adapter that receives power from a power source and generates an adapter output voltage, the adapter output voltage being outputted to vary within a reference voltage range that is substantially narrow and includes a preferred adapter voltage, the preferred adapter voltage being associated with a preferred battery charging condition under which the battery is driven and charged up with a preferred charging power;
   a battery charger, coupled to the adapter, the battery charger generating a battery charging current that is monitored to allow the reference voltage range to track a variation of load condition at the output of the adapter; and
   a battery, coupled to the battery charger, the battery being driven and charged up by the battery charging current when the mobile device is coupled to the power source, power stored in the battery being further used to drive normal operation of the mobile device when the mobile device is decoupled from the power source;
   wherein the preferred battery charging condition is determined when a variation of the battery charging current is sensed to drop during a course of gradually reducing the adapter output voltage from an initial voltage based on a constant voltage step.

2. The battery charging system according to claim 1, wherein the power source is the conventional main electricity, and the adapter is an AC-DC voltage regulator that converts an AC supply voltage to a DC supply voltage, i.e., the adapter output voltage.

3. The battery charging system according to claim 1, wherein the battery charger is implemented as a switching mode battery charger that includes alternative active and inactive periods and further comprises:
   a switching regulator that generates at least one converter control; and
   a buck converter, coupled to the switching regulator, the buck converter comprising at least one inductor for temporary energy storage and being controlled by the at least one converter control to convert the adapter output voltage to the battery charging current.

4. The battery charging system according to claim 3, wherein the switching regulator monitors the output condition of the adapter and adjusts the reference voltage range.

5. The battery charging system according to claim 1, wherein the reference voltage range comprises the voltage step when the preferred battery charging condition is determined and two additional voltage steps that are precedent to the voltage step.

6. A battery charging system that charges up a battery for a mobile device, comprising:
   an adapter that receives power from a power source and generates an adapter output voltage, the adapter output voltage being outputted to vary within a reference voltage range, the reference voltage range being substantially narrow and tracking a variation of load condition at the output of the adapter to include a preferred adapter voltage;
   a battery charger, coupled to the adapter, the battery charger generating a battery charging current to drive and charge up the battery when the mobile device is coupled to the power source, power stored in the battery being further used to drive normal operation of the mobile device when the mobile device is decoupled from the power source; and
   wherein under a preferred battery charging condition, the battery is driven with a preferred charging power that is associated with the preferred adapter voltage in order to achieve a quick battery charge, and
   wherein the preferred battery charging condition is determined when a variation of the battery charging current is sensed to drop during a course of gradually reducing the adapter output voltage from an initial voltage based on a constant voltage step.

7. The battery charging system according to claim 6, wherein the battery charging current is monitored to determine the preferred battery charging condition that changes with the variation of load condition at the output of the adapter, allowing the reference voltage range to track the variation accordingly.

8. The battery charging system according to claim 6, wherein the adapter is a standalone device, while the battery charger is integrated in the mobile device.

9. The battery charging system according to claim 6, wherein the power source provides one form of energy selected from electromagnetic, solar, kinetic and thermal energy, and an interface is included in the adapter to harvest energy based on the selected form of energy.

10. The battery charging system according to claim 6, wherein the battery charger is implemented as a switching mode battery charger that includes alternative active and inactive periods and further comprises:
    a switching regulator that generates at least one converter control; and
    a buck converter, coupled to the switching regulator, the buck converter comprising at least one inductor for temporary energy storage and being controlled by the at least one converter control to convert the adapter output voltage to the battery charging current.

11. The battery charging system according to claim 10, wherein the switching regulator monitors the output condition of the adapter and adjusts the reference voltage range.

12. The battery charging system according to claim 6, wherein the reference voltage range comprises the voltage step when the preferred battery charging condition is determined and two additional voltage steps that are precedent to the voltage step.

13. A method of efficiently charging a battery in a mobile device, comprising the steps of:
    determining a reference voltage range that includes a preferred adapter voltage, the preferred adapter voltage being associated with a preferred battery charging condition under which an adapter receives power from a power source to drive and charges up the battery with a preferred charging power, the reference voltage range being substantially narrow and tracking a variation of load condition at the output of the adapter;

generating an adapter output voltage within the reference voltage range, the adapter output voltage varying within the reference voltage range; and generating a battery charging current to drive and charge up the battery when the mobile device is coupled to the power source; power stored in the battery being further used to drive normal operation of the mobile device when the mobile device is decoupled from the power source;

wherein the preferred battery charging condition is determined when a variation of the battery charging current is sensed to drop during a course of gradually reducing the adapter output voltage from an initial voltage by a constant voltage step.

14. The method according to claim 13, wherein the battery charging current is monitored to determine the preferred battery charging condition that changes with the variation of load condition at the output of the adapter, allowing the reference voltage range to track the variation accordingly.

15. The method according to 13, wherein the power source is the conventional main electricity, and the adapter is an AC-DC voltage regulator that converts an AC supply voltage to a DC supply voltage, i.e., the adapter output voltage.

16. The method according to 13, wherein the power source provides one form of energy selected from electromagnetic, solar, kinetic and thermal energy, and an interface is included in the adapter to harvest energy from the selected form of energy.

17. The method according to 13, wherein the reference voltage range comprises the voltage step when the preferred battery charging condition is determined and two additional voltage steps that are precedent to the voltage step.

* * * * *